United States Patent
Omran et al.

(10) Patent No.: US 12,486,181 B1
(45) Date of Patent: Dec. 2, 2025

(54) METHOD OF PHOTOCATALYTIC DEGRADATION OF A POLLUTANT USING NANOCOMPOSITE

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/281,579

(22) Filed: Jul. 26, 2025

(51) Int. Cl.
| | |
|---|---|
| *C02F 1/30* | (2023.01) |
| *B01J 20/10* | (2006.01) |
| *B01J 23/02* | (2006.01) |
| *B01J 23/22* | (2006.01) |
| *B01J 27/24* | (2006.01) |
| *B01J 35/39* | (2024.01) |
| *B01J 35/61* | (2024.01) |
| *B01J 35/63* | (2024.01) |
| *B01J 35/64* | (2024.01) |
| *B01J 37/34* | (2006.01) |
| *C02F 1/72* | (2023.01) |

(52) U.S. Cl.
CPC .................. *C02F 1/30* (2013.01); *B01J 20/10* (2013.01); *B01J 23/02* (2013.01); *B01J 23/22* (2013.01); *B01J 27/24* (2013.01); *B01J 35/39* (2024.01); *B01J 35/612* (2024.01); *B01J 35/633* (2024.01); *B01J 35/647* (2024.01); *B01J 37/342* (2013.01); *B01J 37/343* (2013.01); *C02F 1/725* (2013.01); *C02F 2305/10* (2013.01)

(58) Field of Classification Search
CPC ... B01J 20/10; B01J 23/02; B01J 23/22; B01J 27/24; B01J 35/39; B01J 35/612; B01J 35/633; B01J 35/647; B01J 37/342; B01J 37/343; C02F 1/30; C02F 1/725; C02F 2305/10

See application file for complete search history.

(56) References Cited

U.S. PATENT DOCUMENTS

2008/0305027 A1  12/2008  Johnston et al.

FOREIGN PATENT DOCUMENTS

| CN | 102923725 B | 9/2014 |
| CN | 108031433 A | 5/2018 |

OTHER PUBLICATIONS

Maryam Karami, et al., "Green fabrication of graphene quantum dots from cotton with CaSiO3 nanostructure and enhanced photocatalytic performance for water treatment", International Journal of Hydrogen Energy, vol. 47, Issue 11, Feb. 5, 2022, pp. 7228-7241 (9 pgs. excerpts only).

Xiaozhou Long, et al., "Enhanced Photocatalysis of g-C3N4 Thermally Modified with Calcium Chloride", Catalysis Letters, vol. 147, Jun. 9, 2017, pp. 1922-1930.

*Primary Examiner* — John Kim
(74) *Attorney, Agent, or Firm* — Oblon, McClelland, Maier & Neustadt, L.L.P.

(57) ABSTRACT

A method of photocatalytic degradation of a polluted solution includes contacting a solution containing one or more pollutants with a graphite-phase carbon nitride, calcium metavanadate, and calcium silicate ($CaV_2O_6/CaSiO_3/g$-$C_3N_4$) nanocomposite, followed by irradiating the nanocomposite with light to degrade one or more pollutants in the solution. The method further includes irradiating the $CaV_2O_6/CaSiO_3/g$-$C_3N_4$ nanocomposite with a light having a wavelength of 200 to 800 nm to photocatalytically degrade the one or more pollutants in the solution.

20 Claims, 4 Drawing Sheets

METHOD OF PHOTOCATALYTIC DEGRADATION OF A POLLUTANT USING NANOCOMPOSITE

BACKGROUND

Technical Field

The present disclosure is directed towards a method of photocatalytic degradation of a pollutant using a nanocomposite, and more particularly, to a method of photocatalytic degradation of a pollutant using the nanocomposite including a graphite-phase carbon nitride, calcium metavanadate, and calcium silicate ($CaV_2O_6$/$CaSiO_3$/g-$C_3N_4$) nanocomposite.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Both organic and inorganic contaminants may have catastrophic consequences and seriously damage environmental systems. Since heavy metal ions are toxic, carcinogenic, and non-biodegradable, the globe is adversely plagued by their contamination. The manufacturing of chemicals, textiles, leather, plastics, mining, batteries, paints & pigments, paper, and pulp are examples of human-induced activities that contribute to heavy metal pollution. The biota is seriously threatened by the untreated discharge of these hazardous metals into streams and effluents. They affect living organisms through food chain, which may cause major illnesses like cancer, harm to the nervous system, and kidney failures. At high concentrations, they can even be lethal. Many common procedures, such as membrane filtration, ion exchange, coagulation, precipitation, reverse osmosis, and adsorption approaches, have been used in the search for a remediation process to remove harmful metal ions. Because of their exceptional exclusion capabilities for incredibly low ions in trace levels, as well as their affordability and ease of use in comparison to traditional procedures, adsorption methods are highly preferred among these approaches. The most prevalent ionic heavy metals found in industrial water runoff include elements like cadmium (Cd), chromium (Cr), copper (Cu), iron (Fe), lead (Pb), nickel (Ni), silver (Ag), zinc (Zn), and uranium (U). However, as the most prized and widely used metal in many engineering applications, such as metal polishing, electroplating, and etching, copper typically finds significant concentrations in wastewater. As a cost-effective metal-free n-type semiconductor that is chemically and thermally stable, visible light responsive, innocuous, and simple to manufacture, graphite-phase carbon nitride (g-$C_3N_4$) has garnered a lot of attention lately [Singh, D.; Gautam, R. K.; Kumar, R.; Shukla, B. K.; Shankar, V.; Krishna, V. *Citric acid coated magnetic nanoparticles: synthesis, characterization and application in removal of Cd (II) ions from aqueous solution. J. Water Process Eng.* 2014, 4, 233-241.]. Its most notable disadvantages are poor specific surface area, rapid electron-hole pair recombination, and challenging exfoliation. Heteroatom doping and changes to the microstructure design are used to get around these drawbacks. As a result, adding metal nanoparticles to g-$C_3N_4$ nanosheets can prevent them from wrapping, maintaining a larger specific surface area and increased adsorption capacity. For example, $MgY_2O_4$-g-$C_3N_4$, Ox-g-$C_3N_4$/Pani-NF, and $CoFe_2O_4$-g-$C_3N_4$ were used to exclude copper ions, whereas CdS/g$C_3N_4$, $Y_2O_3$@g-$C_3N_4$, and ZnO-g-$C_3N_4$ were used to exclude cadmium ions. Several studies have described metal oxides as improving pore volume and average pore size [Sharma, D.; Saini, A.; Choudhary, D.; Kumari, M. K.; Chaudhary, A.; Dhayal, V. *In-situ synthesis of ZnO modified g-$C_3N_4$ composite: a potential photocatalyst and adsorbent for waste water remediation. Mater. Res. Innov.* 2022, 26, 65-75; and Li, D.; Liu, Y.; Liu, Z.; Yang, J.; Hu, C.; Feng, L. *Electrochemical hydrogen evolution reaction efficiently catalyzed by Ru-N coupling in defect-rich Ru/g$C_3N_4$ nanosheets. J. Mater. Chem. A* 2021, 9, 15019-15026.]. Carbon based nanoparticles have a number of benefits. Their highly specialized surface area improves the active area required for different applications and permits greater contact with the electrolyte. Additionally, carbon nanoparticles are electrically conductive, which is important for effective charge and discharge procedures [Ibrahim, T. G.; Almufarij, R. S.; Abdulkhair, B. Y.; Abd Elaziz, M. E. *Eliminating Manifold Pharmaceutical Pollutants with Carbon Nanoparticles Driven via a Short-Duration Ball-Milling Process. Surfaces* 2024, 7, 493-507.]. The performance of carbon nanomaterials can be improved by rapidly loading them with more electrochemically active species. They are also chemically stable. In addition, they are economical and ecologically sustainable. Additionally, the energy density and rate performance of the supercapacitor can be enhanced by including carbon nanomaterials into composites or by combining them with other materials like metal sheets or graphene [Khairy, M.; Algethami, F. K.; Alotaibi, A. N.; Almufarij, R. S.; Babiker, Y. A. *Enhancing the Conductivity and Dielectric Characteristics of Bismuth Oxyiodide via Activated Carbon Doping. Molecules* 2024, 29(9), 2082.]. Because of its special qualities and adaptability, carbon nanomaterials present a viable option for high-performance supercapacitors. For supercapacitors, g-$C_3N_4$ has a number of benefits over activated carbon. First off, unlike activated carbon, which is inactive under visible light, g-$C_3N_4$ is an active photocatalyst. This means that g-$C_3N_4$ can use solar energy to store charge, making it a sustainable and renewable energy source. Furthermore, g-$C_3N_4$ can absorb a wider spectrum of light wavelengths than activated carbon due to its lower bandgap, which enhances supercapacitor performance and energy conversion efficiency. Additionally, by using carbon-defect and two-dimensional engineering, g-$C_3N_4$ may be readily altered and customized to improve its structural characteristics and decrease thickness. These modifications increase surface area and porosity, which are beneficial for charge storage in supercapacitors. Overall, g-$C_3N_4$ offers superior photoactivity, a more comprehensive light absorption range, and enhanced structural properties than activated carbon, making it a promising material for photocatalysis applications.

Accordingly, it is one object of the present disclosure to provide a method of photocatalytic degradation of a pollutant using a nanocomposite that may overcome the drawbacks of prior art.

SUMMARY

In an exemplary embodiment, a method of photocatalytic degradation of a pollutant is described. The method includes contacting a solution comprising one or more pollutants with a graphite-phase carbon nitride, calcium metavanadate, and calcium silicate ($CaV_2O_6$/$CaSiO_3$/g-$C_3N_4$) nanocomposite, followed by irradiating the nanocomposite with light to degrade one or more pollutants in the solution.

In some embodiments, the $CaV_2O_6/CaSiO_3/g-C_3N_4$ nanocomposite includes 20 to 40 percentage by weight (wt. %) of graphite-phase carbon nitride ($g-C_3N_4$), 20 to 40 wt. % of calcium metavanadate ($CaV_2O_6$), and 20 to 40 wt. % of calcium silicate ($CaSiO_3$).

In some embodiments, the $CaV_2O_6/CaSiO_3/g-C_3N_4$ nanocomposite is porous. The $g-C_3N_4$ is in the form of a nanosheet; the $CaV_2O_6$ and the $CaSiO_3$ are a homogenous mixture in the form of nanowires, and the nanowires are distributed in between the nanosheets.

In some embodiments, the $CaV_2O_6/CaSiO_3/g-C_3N_4$ nanocomposite has interplanar spacing of 0.12 to 0.25 nanometer (nm) between the $g-C_3N_4$ sheets.

In some embodiments, the $CaV_2O_6/CaSiO_3/g-C_3N_4$ nanocomposite is porous and has an average pore diameter of 2 to 20 nm.

In some embodiments, the $CaV_2O_6/CaSiO_3/g-C_3N_4$ nanocomposite has a Brunauer-Emmett-Teller (BET) surface area of 55 to 60 square centimeters per gram ($cm^2g^{-1}$).

In some embodiments, the $CaV_2O_6/CaSiO_3/g-C_3N_4$ nanocomposite has a pore volume of 0.1 to 0.3 cubic centimeters per gram ($cm^3g^{-1}$).

In some embodiments, the $CaV_2O_6/CaSiO_3/g-C_3N_4$ nanocomposite has a bandgap energy of 2.9 to 3 electron Volt (eV).

In some embodiments, the $CaV_2O_6/CaSiO_3/g-C_3N_4$ nanocomposite has a bandgap energy of 2.92 eV.

In some embodiments, the $CaV_2O_6/CaSiO_3/g-C_3N_4$ nanocomposite has an absorption at a wavelength of 200 to 500 nm.

In some embodiments, the $CaV_2O_6/CaSiO_3/g-C_3N_4$ nanocomposite is crystalline.

In some embodiments, the $CaV_2O_6/CaSiO_3/g-C_3N_4$ nanocomposite includes a major phase comprising a $CaV_2O_6$ phase and a $CaSiO_3$ phase, and a minor phase includes a $g-C_3N_4$ phase.

In some embodiments, the $CaV_2O_6/CaSiO_3/g-C_3N_4$ nanocomposite has a $CaV_2O_6$ phase with 2θ values of 25° to 50°.

In some embodiments, the $CaV_2O_6/CaSiO_3/g-C_3N_4$ nanocomposite has a $CaSiO_3$ phase with 2θ values of 25° to 45°.

In some embodiments, the $CaV_2O_6/CaSiO_3/g-C_3N_4$ nanocomposite has a $g-C_3N_4$ phase with 2θ values of 45° to 80°.

In some embodiments, the method of irradiating the nanocomposite occurs at a wavelength of 50 to 1000 nm.

In some embodiments, the $CaV_2O_6/CaSiO_3/g-C_3N_4$ nanocomposite has an absorption at a wavelength of 600 to 800 nm.

In another exemplary embodiment, a method of making the $CaV_2O_6/CaSiO_3/g-C_3N_4$ nanocomposite is described. The method includes mixing calcium nitrate and sodium metasilicate in a solvent to form silicate product, followed by heating urea at 500 to 700° C. for 30 to 60 minutes to form $g-C_3N_4$ product, and carbonizing ammonium metavanadate with xylose in an aqueous acid solution to form vanadate product. The method finally includes microwaving the silicate product, the $g-C_3N_4$ product, and the vanadate product in an organic solvent to form the $CaV_2O_6/CaSiO_3/g-C_3N_4$ nanocomposite.

In some embodiments, the $CaV_2O_6/CaSiO_3/g-C_3N_4$ nanocomposite is porous and has slit-shaped pores.

In some embodiments, the method of irradiating the nanocomposite at a wavelength of 200 to 800 nm.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
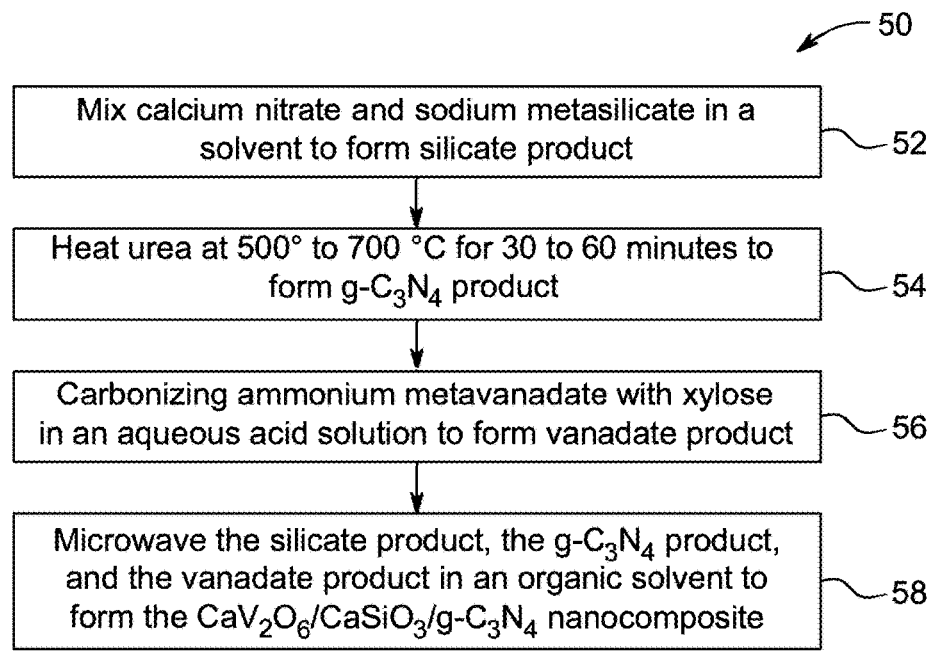
FIG. 1 is an exemplary flowchart of a method of fabrication of a $CaV_2O_6@CaSiO_3@g-C_3N_4$ nanocomposite, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a', 'an', and the like generally carry a meaning of 'one or more', unless stated otherwise.

Furthermore, the terms 'approximately', 'approximate', 'about', and similar terms generally refer to ranges that include the identified value within a margin of 20%, 10%, or preferably 5%, and any values therebetween.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

As used herein, the term 'room temperature' refers to a temperature range of '25 degrees Celsius (° C.)+3° C. in the present disclosure.

As used herein, the term 'nanoparticles (NPs)' refers to particles having a particle size of 1 nm to 500 nanometers (nm). The NPs may exist in various morphological shapes, such as nanotubes, nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, mixtures thereof, and the like.

As used herein, the term 'particulate' refers to small, discrete particles that are suspended in a medium, such as air, water, or a solid matrix. These particles can vary in size, shape, and composition and are often categorized based on their dimensions, such as nanoparticles (1-100 nm) or microparticles (1-1000 micrometers (μm)).

As used herein, the term 'crystalline' refers to a material or substance in which atoms, ions, or molecules are arranged in a highly ordered, repeating pattern extending in three dimensions. This regular atomic structure gives crystalline materials distinct properties, such as well-defined geometric shapes, sharp melting points, and characteristic optical and electrical behaviors.

As used herein, the term 'nanocomposites' refers to a material composed of two or more distinct components, at least one of which has a nanoscale structure, typically in the range of 1 to 100 nm. These components are combined to form a composite material that exhibits properties, such as increased strength, electrical conductivity, chemical reactivity, and/or thermal stability, compared to the individual components. Nanocomposites may be poly-phase solid materials made up of two or more nanomaterials. The term includes all types of multiphase solid material in which one of the phases has one, two, or three dimensions of less than 100 nm, or structures having nanoscale repeat distances between the different phases that make up the material. The definition within the scope of the disclosure includes porous media, colloids, gels, copolymers, and solid combination of a bulk matrix and nanodimensional phase(s) differing in properties due to dissimilarities in structure and chemistry. The nanocomposites morphologies that are generally prepared include phase separated systems, intercalated systems, and exfoliated systems. The nanocomposites include ceramic matrix nanocomposites (CMNC), polymer matrix nanocomposites (PMNC), metal matrix nanocomposites (MMNC), and/or any combination thereof. Nanocomposites may be used in various applications, including catalysis, environmental remediation, electronics, and materials science.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a key parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is an important parameter in characterizing the porous structure of materials, such as adsorbents or catalysts.

As used herein, the term 'water decontamination' refers to the process of removing harmful substances, pollutants, or microorganisms from water to make it safe for human use, environmental discharge, or other applications. This process can involve physical, chemical, or biological methods, including filtration, chemical treatment, or the use of advanced technologies like ultraviolet light or ozone treatment.

As used herein, the term 'contaminants' refers to the harmful substances or pollutants that degrade the quality of water, air, soil, or food, making them unsafe or unsuitable for specific uses. In water, contaminants include biological agents like bacteria, viruses, and parasites; chemical substances such as heavy metals, pesticides, pharmaceuticals, and industrial chemicals; and physical materials like dirt, debris, and sediment. These contaminants can pose serious risks to human health, the environment, and ecosystems, depending on their type, concentration, and exposure levels.

As used herein, the term 'filtrate' refers to the liquid or substance that has passed through a filter, having been separated from solid particles or impurities during the filtration process. In the context of water treatment or laboratory processes, filtrate is the clear liquid that remains after a mixture has been filtered to remove suspended solids, bacteria, or other contaminants. The filtrate typically contains the dissolved components that were not caught by the filter, making it cleaner or purer than the original solution.

As used herein, the term 'photocatalytic activity' refers to the ability of a photocatalyst to accelerate a chemical reaction in the presence of light, typically on the surface of a material.

As used herein, the term 'irradiation' refers to the process of deliberate exposure of an object or a material to radiation.

As used herein, the term 'bandgap energy' refers to the difference in energy between the highest valence band and lowest conduction band. Upon attaining the energy, the electron is excited to a free state and participates in conduction.

As used herein, the term 'absorption' refers to the process in which the light is absorbed by matter and converted into energy. This occurs when the light waves of specific frequencies interact with electrons in an atom, causing them to vibrate and change in energy state. When the frequency of the incoming light wave matches the natural frequency of the electrons, the electrons absorb the energy, leading to various effects depending on the material.

As used herein, the term 'amount' refers to the proportion or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

A wt. % of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopes of nitrogen include $^{14}N$ and $^{15}N$. Isotopes of Ca include $^{40}$Ca, $^{42}$Ca, $^{43}$Ca, $^{44}$Ca, and $^{46}$Ca. Isotopes of silicon include $^{28}$Si, $^{29}$Si, and $^{30}$Si. Isotopes of hydrogen include $^{1}$H, $^{2}$H, and $^{3}$H. Isotopes of vanadium include $^{50}$V and $^{51}$V. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of this disclosure are directed to a method of water purification by using $CaV_2O_6/CaSiO_3/g-C_3N_4$ nanocomposite material. The $CaV_2O_6/CaSiO_3/g-C_3N_4$ nanocomposite material demonstrated excellent photocatalysis efficiency for removing contaminants from the water. The method is for environmentally relevant conditions and offers a sustainable, scalable approach for regenerating and reusing the sorbent. By overcoming limitations of prior methods, this technology provides a practical and thermodynamically favorable solution for mitigating antibiotic pollution in water, contributing to both public health and environmental sustainability.

According to a first aspect of the present disclosure, a method of photocatalytic degradation of a pollutant is described. The method of photocatalytic degradation of a pollutant includes contacting a solution including one or more pollutants with a graphite-phase carbon nitride, calcium metavanadate, and calcium silicate ($CaV_2O_6/CaSiO_3/g-C_3N_4$) nanocomposite, followed by irradiating the nanocomposite with light to degrade one or more pollutants in the solution.

In some embodiments, the contaminated water may include a mixture of synthetic wastewater containing dyes, heavy metals, agricultural runoff, industrial effluents, oil and grease, food processing wastewater, a heavy metal solution, landfill leachate, textile wastewater, mining effluents, household wastewater, and pharmaceutical contaminants. The contaminated water includes one or more contaminants. The one or more contaminants may include heavy metals (e.g., lead, mercury, arsenic), pesticides, herbicides, nitrates, phosphates, pharmaceuticals (e.g., antibiotics, painkillers, hormones), solvents, oils, bacteria (e.g., *E. coli*), viruses, parasites, plastics, detergents, cyanide, sulfuric acid, and sediment. In an embodiment, the contaminant is pharmaceutical. Suitable examples may include, but are not limited to, CTTC, oxytetracycline (OTC), sulfadiazine, ciprofloxacin, erythromycin, streptomycin, amoxicillin, tylosin, penicillin g, doxycycline, ceftriaxone, cefuroxime, chloramphenicol, levofloxacin, trimethoprim, sulfamethoxazole, clarithromycin, moxifloxacin, norfloxacin, lincomycin, tetracycline, rifampicin, ofloxacin, gentamicin, enrofloxacin, ceftazidime, azithromycin, vancomycin, clindamycin, florfenicol, ceftiofur, tiamulin, quinolones, ampicillin, bacitracin, metronidazole, rifaximin, furazolidone, colistin, polymyxin b, fucidic acid, cephalexin, cloxacillin, methylene blue, tigecycline, cefotaxime, nafcillin, ticarcillin, telithromycin, spectinomycin, fusidic acid, norfloxacin, neomycin, erythromycin ethylsuccinate, quinupristin, dalfopristin, linezolid, amikacin, imipenem, meropenem, doripenem, piperacillin, trimethoprim-sulfamethoxazole, pristinamycin, teicoplanin, cefdinir, cefepime, minocycline, carbapenems, gentamicin sulfate, clindamycin phosphate, nitroxoline, methicillin, caspofungin, polymyxin e, teicoplanin, amoxicillin-clavulanate, oxacillin, rifabutin, trimethoprim-sulfamethoxazole, nalidixic acid, furaltadone, levamisole, erythromycin lactobionate, vancomycin hydrochloride, roxithromycin, oxolinic acid, paromomycin, clarithromycin, oxytetracycline HCl, amikacin sulfate, cefoperazone, flumequine, amphenicols, leucomycin, sulfaquinoxaline, sulfamethazine, carbenicillin, aztreonam, ceftobiprole, ceftaroline, furazolidone, ampicillin-sulbactam, piperacillin-tazobactam, temocillin, mupirocin, colistimethate sodium, moxalactam, ropivacaine, lincosamide, linezolid, ticarcillin-clavulanate, lefamulin, bacitracin zinc, isavuconazonium sulfate, cefpodoxime, fosfomycin, chlortetracycline hydrochloride, penicillin v potassium, chloramphenicol sodium succinate, ampicillin trihydrate, ticarcillin sodium, erythromycin stearate, thiamphenicol, trimetoprim-sulfamethoxazole, cefoxitin, cefixime, cefoperazone sodium, nifuroxazide, paromomycin sulfate, daptomycin, fusafungine, monensin, balofloxacin, meticillan, nystatin, nitrofural, trimethoprim, oxytetracycline acetate, ceftazidime-avibactam, albendazole, clarithromycin phosphate, piperacillin/tazobactam, teicoplanin sodium, fidaxomicin, lefamulin acetate, liraglutide, tigecycline, chloroquine, sparfloxacin, valnemulin, trimethoprim, gentamicin sulfate, doxycycline hyclate, mupirocin ointment, cefpiramide, cloxacillin sodium, imipenem-cilastatin, monobactams, azithromycin, methylthioninium chloride, chlorhexidine, amikacin sulfate, ceftriaxone sodium, benzylpenicillin, ceftazidime, moxifloxacin hydrochloride, phenoxymethylpenicillin, rifapentine, chloromycetin, rifabutin, penicillin v, lomefloxacin, oxytetracycline hcl, nelfinavir, acetylspiramycin, amoxicillin trihydrate, ticarcillin, polymyxin e sulfate, amphotericin b, nystatin, cephalothin sodium, gentamicin sulfate, betamethasone, chloramphenicol succinate, pivmecillinam, nalidixic acid, hydroxychloroquine, amoxicillin/clavulanate potassium, furosemide, temocillin, benzylpenicillin, ceftizoxime, cefdinir, daptomycin sodium, methicillin sodium, thiamphenicol, cephradine, ceftobiprole, rifamycin, rifampin, mupirocin, streptogramins, fidaxomicin, sulfasalazine, cefepime, penicillin g, imidazole, cefotaxime sodium, rifaximin, nitrofurantoin, sulfadoxine, nitisinone, neomycin sulfate, doxycycline monohydrate, piperacillin, tazobactam, isoniazid, capreomycin, cephalexin, and trimethoprim-sulfamethoxazole.

The utilization of the wide-range visible-light-region in photocatalytic processes requires a low bandgap (1.77 to 2.92 eV), as a candidate for visible light absorption and utilization for photocatalytic purposes. One of the main goals of using visible light-induced photocatalysts is to displace the harmful ultraviolet light with a safe visible light. The reduced band gap of the nanocomposite and more response to visible light can help achieve more efficient utilization of solar energy and improved photocatalytic activity. The reduced bandgap is also beneficial for high activity in degrading organic compounds under visible light.

In some embodiments, the method of irradiating the nanocomposite occurs at a wavelength of 50 to 1000 nm, preferably 60 to 990 nm, preferably 70 to 980 nm, preferably 80 to 970 nm, preferably 90 to 960 nm, preferably 100 to 950 nm, preferably 110 to 940 nm, preferably 120 to 930 nm, preferably 130 to 920 nm, preferably 140 to 910 nm, preferably 150 to 900 nm, preferably 160 to 890 nm, preferably 170 to 880 nm, preferably 180 to 870 nm, preferably 200 to 850 nm, and preferably 60 to 990 nm. In a preferred embodiment, the method of irradiating the nanocomposite occurs at a wavelength of 200 to 800 nm.

In some embodiments, the $CaV_2O_6/CaSiO_3/g-C_3N_4$ nanocomposite has an absorption at a wavelength of 200 to 500 nm, preferably 205 to 445 nm, preferably 210 to 440 nm, preferably 215 to 435 nm, preferably 220 to 430 nm, preferably 225 to 425 nm, preferably 230 to 420 nm, preferably 235 to 415 nm, preferably 240 to 410 nm, preferably 245 to 405 nm, and preferably 250 to 400 nm.

In some embodiments, the $CaV_2O_6/CaSiO_3/g-C_3N_4$ nanocomposite has an absorption at a wavelength of 600 to 800 nm, preferably 605 to 795 nm, preferably 610 to 790 nm, preferably 615 to 785 nm, preferably 620 to 780 nm, preferably 625 to 775 nm, preferably 630 to 770 nm, preferably 635 to 765 nm, preferably 640 to 760 nm, preferably 645 to 755 nm, and preferably 650 to 750 nm.

In some embodiments, the $CaV_2O_6/CaSiO_3/g-C_3N_4$ nanocomposite has a bandgap energy of 2.9 to 3 eV, preferably 2.905 to 2.995 eV, preferably 2.910 to 2.990 eV, and preferably 2.915 to 2.985 eV. In a preferred embodiment, the $CaV_2O_6/CaSiO_3/g-C_3N_4$ nanocomposite has a bandgap energy of 2.92 eV.

In some embodiments, the $CaV_2O_6/CaSiO_3/g-C_3N_4$ nanocomposite includes a graphite-phase carbon nitride (g-$C_3N_4$) in an amount of 20 to 40 percent by weight (wt. %), preferably 21 to 39 wt. %, preferably 22 to 38 wt. %, preferably 23 to 37 wt. %, preferably 24 to 36 wt. %, preferably 25 to 35 wt. %, and preferably 26 to 34 wt. %, based on the total weight of the $CaV_2O_6/CaSiO_3/g-C_3N_4$ nanocomposite.

In some embodiments, the $CaV_2O_6/CaSiO_3/g-C_3N_4$ nanocomposite includes calcium silicate ($CaSiO_3$) in an amount of 20 to 40 wt. %, preferably 21 to 39 wt. %, preferably 22 to 38 wt. %, preferably 23 to 37 wt. %, preferably 24 to 36 wt. %, preferably 25 to 35 wt. %, and preferably 26 to 34 wt. %, based on the total weight of the $CaV_2O_6/CaSiO_3/g-C_3N_4$ nanocomposite.

In some embodiments, the $CaV_2O_6/CaSiO_3/g-C_3N_4$ nanocomposite includes calcium metavanadate ($CaV_2O_6$) in an amount of 20 to 40 wt. %, preferably 21 to 39 wt. %, preferably 22 to 38 wt. %, preferably 23 to 37 wt. %, preferably 24 to 36 wt. %, preferably 25 to 35 wt. %, and preferably 26 to 34 wt. %, based on a total weight of the $CaV_2O_6/CaSiO_3/g-C_3N_4$ nanocomposite. In a preferred embodiment, the $CaV_2O_6/CaSiO_3/g-C_3N_4$ nanocomposite includes an equal mass of $CaSiO_3$, g-$C_3N_4$, and $V_2O_5$, based on the total weight of the $CaV_2O_6/CaSiO_3/g-C_3N_4$ nanocomposite.

In some embodiments, the $CaV_2O_6/CaSiO_3/g-C_3N_4$ nanocomposite is crystalline. In some embodiments, the $CaV_2O_6/CaSiO_3/g-C_3N_4$ nanocomposite includes a major $CaV_2O_6$ phase, a major $CaSiO_3$ phase, and a minor g-$C_3N_4$ phase. In a preferred embodiment, $CaV_2O_6$ exists in monoclinic crystalline phase. In some embodiments, $CaV_2O_6$ may exist in orthorhombic crystalline phase. In some embodiments, $CaSiO_3$ may exist in other crystalline phases, including monoclinic, triclinic and orthorhombic crystalline phases. In some embodiments, g-$C_3N_4$ may exist in a cubic, hexagonal or triclinic crystalline phase. In some embodiments, g-$C_3N_4$ may exist in a semi-crystalline phase.

In some embodiments, the $CaV_2O_6/CaSiO_3/g-C_3N_4$ nanocomposite has a $CaV_2O_6$ phase with 2θ values of 25° to 50°. In a preferred embodiment, the $CaV_2O_6/CaSiO_3/g-C_3N_4$ nanocomposite has a $CaV_2O_6$ phase with 2θ values of 25.1°, 25.9°, 27.8°, 27.9°, 30.1°, 36.8°, 36.9, 39.7°, and 49.6°, assigned to (201), (100), (−202), (−111), (111), (−311), (400), (003) and (020) planes of the monoclinic phase of $CaV_2O_6$, as obtained from XRD analysis.

In some embodiments, the $CaV_2O_6/CaSiO_3/g-C_3N_4$ nanocomposite has a $CaSiO_3$ phase with 2θ values of 25° to 45°. In a preferred embodiment, the $CaV_2O_6/CaSiO_3/g-C_3N_4$ nanocomposite has a $CaSiO_3$ phase with 2θ values of 25.2°, 30.2°, and 41.8°, assigned to (002), (120), and (−231) planes of $CaSiO_3$, as obtained from XRD analysis.

In some embodiments, the $CaV_2O_6/CaSiO_3/g-C_3N_4$ nanocomposite has a g-$C_3N_4$ phase with 2θ values of 45° to 80°, preferably 45.1° to 79.9°, preferably 45.2° to 79.8°, preferably 45.3° to 79.7°, preferably 45.4° to 79.6°, and preferably 45.5° to 79.5°. In a preferred embodiment, the $CaV_2O_6/CaSiO_3/g-C_3N_4$ nanocomposite has a g-$C_3N_4$ phase with 2θ values of 45.8°, 53.7°, 71.8° and 79.4°, as obtained from XRD analysis.

In some embodiments, the nanocomposite may exist in various morphological shapes, such as nanotubes, nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, and mixtures thereof. In a preferred embodiment, the $CaV_2O_6/CaSiO_3/g-C_3N_4$ nanocomposite is porous, and has a slit-shaped pores. In a preferred embodiment, the porous structure of $CaV_2O_6/CaSiO_3/g-C_3N_4$ nanocomposite is constructed with curled and wrinkled nanosheets and platelets of the g-$C_3N_4$. In a preferred embodiment, the $CaV_2O_6/CaSiO_3/g-C_3N_4$ nanocomposite comprises metal oxides in the form of homogeneous nanowires, and the metal oxides are distributed in between the nanosheets of g-$C_3N_4$.

In some embodiments, the graphitic $C_3N_4$ in the nanocomposite comprises sheet morphologies, preferably nanosheets, although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures thereof are also possible. In a preferred embodiment, the g-$C_3N_4$ is porous with a structure of a nanosheet, and the $CaV_2O_6$ and the $CaSiO_3$ deposit in between the sheets of g-$C_3N_4$.

In some embodiments, the homogeneous nanowires of metal oxides, on nanosheets of g-$C_3N_4$, has an average length in the range of from 50 to about 150 nm, preferably 55 to 145 nm, preferably 60 to 140 nm, preferably 65 to 135 nm, preferably 70 to 130 nm, preferably 75 to 125 nm, preferably 80 to 120 nm, preferably 85 to 125 nm, and preferably 90 to 120 nm, as determined using TEM. In a preferred embodiment, the homogeneous nanowires of metal oxides have an average length of 90.6 nm on nanosheets of g-$C_3N_4$, as determined using TEM.

In some embodiments, the $CaV_2O_6@CaSiO_3@g-C_3N_4$ nanocomposite has g-$C_3N_4$ nanosheets with an interplanar spacing of 0.12 to 0.25 nm, preferably 0.122 to 0.248 nm, preferably 0.124 to 0.246 nm, preferably 0.126 to 0.244 nm, preferably 0.128 to 0.242 nm, preferably 0.130 to 0.240 nm, preferably 0.132 to 0.238 nm, preferably 0.134 to 0.236 nm, preferably 0.136 to 0.234 nm, and preferably 0.138 to 0.232 nm. In a preferred embodiment, the $CaV_2O_6@CaSiO_3@g-C_3N_4$ nanocomposite has g-$C_3N_4$ nanosheets with an interplanar spacing of 0.23 nm, 0.219 nm, 0.17 nm, and 0.146 nm, as determined by SAED analysis. In a preferred embodiment, the nanocomposite has an interplanar spacing of 0.23 nm, 0.219 nm, 0.17, and 0.146 nm due to (003, $CaV_2O_6$), (−231, $CaSiO_3$) and (003, $CaV_2O_6$), diffraction planes, respectively.

The Brunauer-Emmett-Teller (BET) hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

In some embodiments, the $CaV_2O_6/CaSiO_3/g-C_3N_4$ nanocomposite has a Brunauer-Emmett-Teller (BET) surface area of 55 to 60 square meter per gram ($m^2g^{-1}$), preferably 55.2 to 59.8 $m^2g^{-1}$, preferably 55.4 to 59.6 $m^2g^{-1}$, preferably 55.6 to 59.4 $m^2g^{-1}$, preferably 55.8 to 59.2 $m^2g^{-1}$, preferably 56.0 to 59.0 $m^2g^{-1}$, preferably 56.2 to 58.8 $m^2g^{-1}$, preferably 56.4 to 58.6 $m^2g^{-1}$, preferably 56.6 to 58.4 $m^2g^{-1}$, preferably 56.8 to 58.2 $m^2g^{-1}$, and preferably 57.0 to 58.0 $m^2g^{-1}$. In a preferred embodiment, the $CaV_2O_6/CaSiO_3/g-C_3N_4$ nanocomposite has a Brunauer-Emmett-Teller (BET) surface area of 57.02 $m^2g^{-1}$.

A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm. The term 'mesoporous' means the pores of the nanocomposite have an average pore width of 2-50 nm. The term 'macroporous' means the pores of nanocomposite have an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT). In some embodiments, the $CaV_2O_6@CaSiO_3@g-C_3N_4$ nanocomposite is porous, and the pores are in the form of slits.

In some embodiments, the average pore distribution of the nanocomposite as determined by Barrett-Joyner-Halenda (BJH) desorption analysis may include, but is not limited to, crystalline average pore distribution, bimodal, trimodal, multimodal, narrow, broad, and Gaussian. In a preferred embodiment, the crystalline nanocomposite has a multimodal pore size distribution, as determined by BJH desorption analysis.

In some embodiments, the nanocomposite has a trimodal pore size distribution, as determined by BJH desorption analysis. The term "trimodal pore size distribution" refers to the material's pore structure in BET (Brunauer-Emmett-Teller) analysis. In a trimodal distribution, the porous materials contain significant populations of pores in three different size ranges. A porous material, with trimodal distribution, has pores of different sizes like micropores (approximately 1.5 nm), mesopores (2-50 nm) and macropores (greater than 50 nm). This type of pore structure enhances properties like adsorption, permeability, and diffusion, making it ideal for applications in catalysis, gas separation, and filtration. Micropores provide high surface area, mesopores allow molecule diffusion, and macropores facilitate bulk transport. Different pore sizes may target multiple contaminants or particles. Compared to unimodal or bimodal distributions, trimodal materials offer a wide variety performance associated with porosity, which is important for material functionality in various industrial and scientific applications.

In some embodiments, the $CaV_2O_6@CaSiO_3@g-C_3N_4$ nanocomposite is porous, and has an average pore diameter of 2 to 20 nm, preferably 2.2 to 19.8 nm, preferably 2.4 to 19.6 nm, preferably 2.6 to 19.4 nm, preferably 2.8 to 19.2 nm, preferably 3.0 to 19.0 nm, preferably 3.2 to 18.8 nm, preferably 3.4 to 18.6 nm, preferably 3.6 to 18.4 nm, preferably 3.8 to 18.2 nm, preferably 4.0 to 18.0 nm, and preferably 4.2 to 17.8 nm. In a preferred embodiment, the $CaV_2O_6@CaSiO_3@g-C_3N_4$ nanocomposite is porous, and has an average pore diameter maximized at 4.3 nm, 8.5 nm, and 14.27 nm.

In some embodiments, the $CaV_2O_6@CaSiO_3@g-C_3N_4$ nanocomposite has a pore volume to 0.1 to 0.3 cubic centimeters per gram ($cm^3g^{-1}$), preferably 0.105 to 0.295 $cm^3g^{-1}$, preferably 0.110 to 0.290 $cm^3g^{-1}$, preferably 0.115 to 0.285 $cm^3g^{-1}$, preferably 0.120 to 0.280 $cm^3g^{-1}$, preferably 0.125 to 0.275 $cm^3g^{-1}$, preferably 0.130 to 0.270 $cm^3g^{-1}$, preferably 0.135 to 0.265 $cm^3g^{-1}$, preferably 0.140 to 0.260 $cm^3g^{-1}$, preferably 0.145 to 0.255 $cm^3g^{-1}$, preferably 0.150 to 0.250 $cm^3g^{-1}$, preferably 0.155 to 0.245 $cm^3g^{-1}$, preferably 0.160 to 0.240 $cm^3g^{-1}$, preferably 0.165 to 0.235 $cm^3g^{-1}$, preferably 0.17 to 0.23 $cm^3g^{-1}$, and preferably 0.175 to 0.225 $cm^3g^{-1}$. In a preferred embodiment, the $CaV_2O_6@CaSiO_3@g-C_3N_4$ nanocomposite is porous, and has a pore volume of 0.22 $cm^3g^{-1}$.

In some embodiments, the nanocomposite has a hysteresis loop of Type H3 (International Union of Pure and Applied Chemistry (IUPAC) classification), as determined by $N_2$ adsorption-desorption analysis at 77 Kelvin (K). In BET nitrogen adsorption-desorption analysis, hysteresis loops provide insight into the pore structure of materials. The H1 hysteresis loop is typically associated with materials having uniform, cylindrical mesopores, indicating a well-ordered and open porous structure. The H2 loop indicates the presence of complex pore geometries such as ink-bottle pores, where narrow necks are connected to wider cavities, often indicating pore blocking or restricted diffusion. The H3 hysteresis loop is common in materials composed of plate-like particles, such as layered or sheet-like structures, and reflects the presence of slit-shaped mesopores without pore filling at high relative pressures. Lastly, the H4 loop is similar to H3 but generally indicates narrower slit-like pores and often points to a combination of micro- and mesoporosity, commonly observed in more compact or disordered porous solids. In some embodiments, the nanocomposite may have a hysteresis loop of Type H4, H2, and H1.

FIG. 1 illustrates a schematic flow chart of a method 50 of preparing the $CaV_2O_6@CaSiO_3@g-C_3N_4$ nanocomposite. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes mixing calcium nitrate and sodium metasilicate in a solvent to form a silicate product. In some embodiments, calcium salt may include, but is not limited to, calcium sulfate, calcium chloride, calcium oxide, calcium carbonate, calcium hydroxide, calcium bromide, calcium iodide, calcium acetate, calcium fluoride, calcium tartrate, calcium citrate, calcium stearate, calcium lactate, calcium gluconate, calcium salicylate, calcium perchlorate, calcium phosphate, calcium arsenate, calcium metaborate, calcium silicate, calcium molybdate, calcium tungstate, calcium chromate, calcium aluminate, calcium stannate, calcium titanate, calcium ferrocyanide, calcium pyrophosphate, and calcium benzoate.

In some embodiments, metasilicate salt may include, but is not limited to, lithium metasilicate, sodium metasilicate, potassium metasilicate, rubidium metasilicate, cesium metasilicate, calcium metasilicate, magnesium metasilicate, barium metasilicate, beryllium metasilicate, strontium metasilicate, zinc metasilicate, iron metasilicate, aluminium metasilicate, lead metasilicate, manganese metasilicate, cobalt metasilicate, chromium metasilicate, and cerium metasilicate.

In some embodiments, the weight ratio of calcium nitrate and sodium metasilicate salt is 1:1.

In some embodiments, the solvent may include, but is not limited to, methanol, propanol, isopropanol, butanol, isobutanol, sec-butanol, tert-butanol, 1-propanol, 2-propanol, 1-butanol, 2-butanol, methylpropanol, dimethylpropanol, ethylpropanol, cyclopropanol, fluoromethanol, chloromethanol, bromomethanol, and iodomethanol. In a preferred embodiment, the solvent is ethanol. In some embodiments, the volume-by-volume (v/v) ratio of water to ethanol is in the range of 1:5 to 5:1, preferably 1:4 to 4:1, preferably 1:3 to 3:1, preferably 1:2 to 2:1, preferably 1:1. In a preferred embodiment, the v/v ratio of water to ethanol is 1:1.

In some embodiments, the method includes heating the solution to form a dry product of $CaSiO_3$ at a temperature from about 150° C. to 250° C., preferably 155° C. to 245° C., preferably 160° C. to 240° C., preferably 165° C. to 235° C., preferably 170° C. to 230° C., and preferably 175° C. to 225° C. This step involves the chemical reaction and dehydration process that are necessary for converting the precursor materials into the desired solid product. The solution is preferably heated in an autoclave, optionally, other known heating appliances may be used as well. In some embodiments, the solution is heated for 1 to 5 hours, preferably 1.5 to 5 hours, preferably 2 to 5 hours, preferably 2.5 to 5 hours, preferably 3 to 5 hours, preferably 3.5 to 5 hours, preferably 4 to 5 hours, preferably 4.5 to 5 hours. In a preferred embodiment, the solution is heated at 180° C. for 2 hours. The formation of $CaSiO_3$ in a furnace follows a precipitation and thermal reaction mechanism.

Filtration may be done using a filter paper, by centrifugation, internal and external filtration, gravity filtration, vacuum filtration, pressure filtration, membrane filtration, decantation, gas flotation, capacitance-based separation, and microfiltration. Alternate techniques for separation include natural and forced sedimentation, magnetic separation, vacuum distillation, chemical conversion, and chromatography. In a preferred embodiment, the product was filtered via a Buchner system.

At step 54, the method 50 includes heating urea at 500° C. to 700° C. for 30 to 60 minutes to form $g-C_3N_4$ product. In some embodiments, the urea is heated at a temperature at 500° to 700° C., preferably 510° to 690° C., preferably 520° to 680° C., preferably 530° to 670° C., preferably 540° to 660° C., preferably 550° to 650° C., preferably 560° to 640° C., preferably 570° to 630° C., preferably 580° to 620° C., and preferably 590° to 610° C. for 30 to 60 minutes (min), preferably 32 to 58 min, preferably 34 to 56 min, preferably 36 to 54 min, preferably 38 to 52 min, preferably 40 to 50, preferably 42 to 48 min, and preferably 44 to 46 min. In a preferred embodiment, $g-C_3N_4$ is formed by heating urea in a closed vessel at a temperature of 600° C. for 45 min.

In some embodiments, the precursor for $g-C_3N_4$ may include, but is not limited to, melamine, urea, dicyandiamide, cyanamide, thiourea, guanidine, ammonium thiocyanate, biguanide, and semicarbazide. In a preferred embodiment, the precursor used for synthesis of $g-C_3N_4$ is urea.

At step 56, the method 50 includes carbonizing ammonium metavanadate with xylose in an aqueous acid solution to form vanadate product. In some embodiments, the mixture is heated at a temperature range from 80° C. to 150° C., preferably 85° C. to 145° C., preferably 90° C. to 140° C., preferably 95° C. to 135° C., preferably 100° C. to 130° C., and preferably 105° C. to 125° C., for a duration in a range from 3 to 7 h, preferably 3.5 to 6.5 h, preferably 4.0 to 6.0 h, and preferably 4.5 to 4.5 to 5.5 h. In a preferred embodiment, the mixture is heated at a temperature of 120° C. for 5.0 h.

In some embodiments, the method includes calcinating the solid product at a temperature of 450° C. to 700° C., preferably 460° C. to 690° C., preferably 470° C. to 680° C., preferably 480° C. to 670° C., preferably 490° C. to 660° C., preferably 500° C. to 650° C., preferably 510° C. to 640° C., preferably 520° C. to 630° C., preferably 530° C. to 620° C., and preferably 540° C. to 610° C. for 2 to 4 hours, preferably 2.2 to 3.8 h, preferably 2.4 to 3.6 h, preferably, 2.6 to 3.4 h, and preferably 2.8 to 3.2 h. In a preferred embodiment, the solid product is calcined at 550° C. or 3.0 h.

At step 58, the method 50 includes microwaving the silicate product, the $g-C_3N_4$ product, and the vanadate product in an organic solvent to form the $CaV_2O_6@CaSiO_3@g-C_3N_4$ nanocomposite. In some embodiments, the silicate product is calcium silicate ($CaSiO_3$), and the vanadate product is vanadium oxide ($V_2O_5$).

In some embodiments, the polar protic solvent may include but are not limited to water, methanol, ethanol, propanol, isopropanol, butanol, isobutanol, sec-butanol, tert-butanol, pentanol, hexanol, heptanol, octanol, nonanol, decanol, formic acid, acetic acid, propionic acid, butyric acid, lactic acid, glycolic acid, glycerol, ethylene glycol, propylene glycol, diethylene glycol, triethylene glycol, 1,2-butanediol, 1,3-butanediol, 1,2-pentanediol, and 1,3-propanediol. In a preferred embodiment, the polar protic solvent is polyol.

In some embodiments, the polyol has a number average molecular weight 200 to about 300 mg KOH/g, preferably 200 to about 400 mg KOH/g, preferably 200 to about 500 mg KOH/g, preferably 200 to about 600 mg KOH/g, preferably 200 to about 700 mg KOH/g, preferably 200 to about 800 mg KOH/g, preferably 200 to about 900 mg KOH/g, preferably 200 to about 1000 mg KOH/g, preferably 200 to about 1100 mg KOH/g, preferably 200 to about 1200 mg KOH/g, preferably 200 to about 1300 mg KOH/g, 200 to about 1400 mg KOH/g, preferably 200 to about 1500 mg KOH/g, preferably 200 to about 1600 mg KOH/g, preferably 200 to about 1700 mg KOH/g, preferably 200 to about 1800 mg KOH/g, preferably 200 to about 1900 mg KOH/g, preferably 200 to about 2000 mg KOH/g, preferably 200 to about 2100 mg KOH/g, preferably 200 to about 2200 mg KOH/g, preferably 200 to about 2300 mg KOH/g, preferably 200 to about 2400 mg KOH/g, preferably 200 to about 2500 mg KOH/g, preferably 200 to about 2600 mg KOH/g, preferably 200 to about 2700 mg KOH/g, preferably 200 to about 2800 mg KOH/g, preferably 200 to about 2900 mg KOH/g, preferably 200 to about 3000 mg KOH/g, preferably 200 to about 3100 mg KOH/g, preferably 200 to about 3200 mg KOH/g, preferably 200 to about 3300 mg KOH/g, preferably 200 to about 3400 mg KOH/g, preferably 200 to about 3500 mg KOH/g, preferably 200 to about 3600 mg KOH/g, preferably 200 to about 3700 mg KOH/g, preferably 200 to about 3800 mg KOH/g, preferably 200 to about 3900 mg KOH/g, preferably 200 to about 4000 mg KOH/g, preferably 200 to about 4100 mg KOH/g, preferably 200 to about 4200 mg KOH/g, preferably 200 to about 4300 mg KOH/g, preferably 200 to about 4400 mg KOH/g, preferably 200 to about 4500 mg KOH/g, preferably 200 to about 4600 mg KOH/g, preferably 200 to about 4700 mg KOH/g, preferably 200 to about 4800 mg KOH/g, preferably 200 to about 4900 mg KOH/g, preferably 200 to about 4950 mg KOH/g, and an hydroxyl number preferably from 25 to about 35 mg KOH/g, preferably from 25 to about 40 mg KOH/g, preferably from 25 to about 50 mg KOH/g, preferably from 25 to about 55 mg KOH/g, preferably from 25 to about 60 mg KOH/g, preferably from 25 to about 65 mg KOH/g, preferably from 25 to about 70 mg KOH/g, preferably from 25 to about 75 mg KOH/g, preferably from 25 to about 80 mg KOH/g, preferably from 25 to about 85 mg KOH/g, preferably from 25 to about 90 mg KOH/g, preferably from 25 to about 95 mg KOH/g, preferably from 25 to about 100 mg KOH/g, preferably from 25 to about 105 mg KOH/g, preferably from 25 to about 110 mg KOH/g, preferably 25 to about 115 mg KOH/g, preferably 25 to about 120 mg KOH/g, preferably 25 to about 125 mg KOH/g, preferably 25 to about 130 mg KOH/g, preferably 25 to about 135 mg KOH/g, preferably 25 to about 140 mg KOH/g, preferably 25 to about 145 mg KOH/g, preferably 25 to about 150 mg KOH/g, preferably 25 to about 155 mg KOH/g, preferably 25 to about 160 mg KOH/g, preferably 25 to about 165 mg KOH/g, preferably 25 to about 170 mg KOH/g, preferably 25 to about 175 mg KOH/g, preferably 25 to about 180 mg KOH/g, preferably 25 to about 185 mg KOH/g, preferably 25 to about 190 mg KOH/g, preferably 25 to about 195 mg KOH/g, preferably 25 to about 200 mg KOH/g, preferably from 25 to about 205 mg KOH/g, preferably from 25 to about 210 mg KOH/g, preferably 25 to about 215 mg KOH/g, preferably 25 to about 220 mg KOH/g, preferably 25 to about 225 mg KOH/g, preferably 25 to about 230 mg KOH/g, preferably 25 to about 235 mg KOH/g, preferably 25 to about 240 mg KOH/g, preferably 25 to about 245 mg KOH/g, preferably 25 to about 250 mg KOH/g, preferably 25 to about 255 mg KOH/g, preferably 25 to about 260 mg KOH/g, preferably 25 to about 265 mg KOH/g, preferably 25 to about 270 mg KOH/g, preferably 25 to about 275 mg KOH/g, preferably 25 to about 280 mg KOH/g, preferably 25 to about 285 mg KOH/g, preferably 25 to about 290 mg KOH/g, preferably 25 to about 295 mg KOH/g, preferably 25 to about 300 mg KOH/g, preferably from 25 to about 305 mg KOH/g, preferably from 25 to about 310 mg KOH/g, preferably 25 to about 315 mg KOH/g, preferably 25 to about 320 mg KOH/g, preferably 25 to about 325 mg KOH/g, preferably 25 to about 330 mg KOH/g, preferably 25 to about 335 mg KOH/g, preferably 25 to about 340 mg KOH/g, preferably 25 to about 345 mg KOH/g, preferably 25 to about 350 mg KOH/g, preferably 25 to about 355 mg KOH/g, preferably 25 to about 360 mg KOH/g, preferably 25 to about 365 mg KOH/g, preferably 25 to about 370 mg KOH/g, preferably 25 to about 375 mg KOH/g, preferably 25 to about 380 mg KOH/g, preferably 4 to about 385 mg KOH/g, preferably 25 to about 390 mg KOH/g, preferably 25 to about 395 mg KOH/g, preferably 25 to about 400 mg KOH/g, preferably from 25 to about 405 mg KOH/g, preferably from 25 to about 410 mg KOH/g, preferably 25 to about 415 mg KOH/g, preferably 25 to about 420 mg KOH/g, preferably 25 to about 425 mg KOH/g, preferably 25 to about 430 mg KOH/g, preferably 25 to about 435 mg KOH/g, preferably 25 to about 440 mg KOH/g, preferably 25 to about 445 mg KOH/g, preferably 25 to about 450 mg KOH/g, preferably 25 to about 455 mg KOH/g, preferably 25 to about 460 mg KOH/g, preferably 25 to about 465 mg KOH/g, preferably 25 to about 470 mg KOH/g, preferably 25 to about 475 mg KOH/g, preferably 25 to about 480 mg KOH/g, preferably 25 to about 485 mg KOH/g, preferably 25 to about 490 mg KOH/g, and preferably 25 to about 495 mg KOH/g.

In some embodiments, the polyol is selected from the group consisting of polyester polyols; polyether polyols; poly(ether-ester) polyols; poly(alkylene carbonate) polyols; and, mixtures thereof.

In some embodiments, the polyester polyols preferably include poly(ethylene glycol), poly(propylene glycol) and poly(tetrahydrofuran). The polyester polyols also include conventional polyester polyols, polycaprolactone polyols and polycarbonate diols, which contain ester groups or carbonate groups, and generally referred polyester polyols obtained by polycondensation of dicarboxylic acids with glycols and the like. The polyester polyols also include bio-based and eco-friendly polyester polyols.

In some embodiments, the polyether polyols preferably include Polyether Polyol (PPG), Polymeric Polyol (POP), Polytetramethylene ether glycol (PTMEG), specialty PPG polyols such as SAN grafted polyether polyol, EG "tipped" PPG polyols, poly(tetramethylene) glycol (PTMO), poly(propylene oxide) (PPO), poly(ethylene) glycol (PEG) or a mixture thereof.

In some embodiments, the polyester polyol includes poly (ether-co-ester) polyol, poly (ether-co-hydrocarbon) polyol, poly (ether-co-siloxane) polyol, poly (ester-co-siloxane) polyol, poly (ether-co-carbonate) polyol, poly (ester-co-carbonate) polyol, poly (ester-co-hydrocarbon) polyol, or mixtures thereof. In some embodiments, polycarbonate polyol include hydrocarbon polyol, polysiloxane polyol, poly(ether-co-ester) polyol, poly(ether-co-carbonate) polyol, poly(ether-co-hydrocarbon) polyol, poly(ether-co-siloxane) polyol, poly(ester-co-carbonate) polyol, poly(ester-co-hydrocarbon) polyol, poly(ester-co-siloxane) polyol, poly(carbonate-co-hydrocarbon) polyol, poly(carbonate-co-siloxane) polyol, poly(hydrocarbon-co-siloxane) polyol, or a mixture thereof.

In some embodiments, the polyester polyol is a poly (ether-ester) polyols preferably Polyether ester polyols are understood in accordance with the invention to mean those polyols having a chemical structure including both ether and ester groups. Examples of the polyether polyol include polyoxy (C2 to C3) alkylene polyols and polytetramethylene ether polyols.

In some embodiments, the polyester polyol is a poly (alkylene carbonate) polyols. The poly(alkylene carbonate) polyols included here can be prepared by reacting an oxirane with either carbon dioxide or a cyclic alkylene carbonate, or a mixture thereof in the presence of a suitable initiator. Suitable oxiranes include ethylene oxide, propylene oxide, butylene oxide, styrene oxide, and the like. Most preferred is ethylene oxide due to its relatively facile reaction with carbon dioxide and/or a cyclic alkylene carbonate.

In some embodiments, the polyol includes a polyoxy (C2-C3)alkylene polyol. More specific examples of the polyoxy (C2 to C3)alkylene polyol include polyoxyethylene polyols, polyoxypropylene polyols, and polyoxyethylene.p-olyoxypropylene (random and/or block) copolymers or any combinations thereof.

In alternate embodiments, the polyol further includes a polyoxy (C2-C3)alkylene polyol having a number average molecular weight of from about 200 to about 5000 g/mol. and an hydroxyl number of from about 25 to about 500 mg KOH/g.

In some embodiments, the polyoxy (C2-C3)alkylene polyol has a number average molecular weight 200 to about 300 mg KOH/g, preferably 200 to about 400 mg KOH/g, preferably 200 to about 500 mg KOH/g, preferably 200 to about 600 mg KOH/g, preferably 200 to about 700 mg KOH/g, preferably 200 to about 800 mg KOH/g, preferably 200 to about 900 mg KOH/g, preferably 200 to about 1000 mg KOH/g, preferably 200 to about 1100 mg KOH/g, preferably 200 to about 1200 mg KOH/g, preferably 200 to about 1300 mg KOH/g, 200 to about 1400 mg KOH/g, preferably 200 to about 1500 mg KOH/g, preferably 200 to about 1600 mg KOH/g, preferably 200 to about 1700 mg KOH/g, preferably 200 to about 1800 mg KOH/g, preferably 200 to about 1900 mg KOH/g, preferably 200 to about 2000 mg KOH/g, preferably 200 to about 2100 mg KOH/g, preferably 200 to about 2200 mg KOH/g, preferably 200 to about 2300 mg KOH/g, preferably 200 to about 2400 mg KOH/g, preferably 200 to about 2500 mg KOH/g, preferably 200 to about 2600 mg KOH/g, preferably 200 to about 2700 mg KOH/g, preferably 200 to about 2800 mg KOH/g, preferably 200 to about 2900 mg KOH/g, preferably 200 to about 3000 mg KOH/g, preferably 200 to about 3100 mg KOH/g, preferably 200 to about 3200 mg KOH/g, preferably 200 to about 3300 mg KOH/g, preferably 200 to about 3400 mg KOH/g, preferably 200 to about 3500 mg KOH/g, preferably 200 to about 3600 mg KOH/g, preferably 200 to about 3700 mg KOH/g, preferably 200 to about 3800 mg KOH/g, preferably 200 to about 3900 mg KOH/g, preferably 200 to about 4000 mg KOH/g, preferably 200 to about 4100 mg KOH/g, preferably 200 to about 4200 mg KOH/g, preferably 200 to about 4300 mg KOH/g, preferably 200 to about 4400 mg KOH/g, preferably 200 to about 4500 mg KOH/g, preferably 200 to about 4600 mg KOH/g, preferably 200 to about 4700 mg KOH/g, preferably 200 to about 4800 mg KOH/g, preferably 200 to about 4900 mg KOH/g, preferably 200 to about 4950 mg KOH/g, and an hydroxyl number preferably from 25 to about 35 mg KOH/g, preferably from 25 to about 40 mg KOH/g, preferably from 25 to about 50 mg KOH/g, preferably from 25 to about 55 mg KOH/g, preferably from 25 to about 60 mg KOH/g, preferably from 25 to about 65 mg KOH/g, preferably from 25 to about 70 mg KOH/g, preferably from 25 to about 75 mg KOH/g, preferably from 25 to about 80 mg KOH/g, preferably from 25 to about 85 mg KOH/g, preferably from 25 to about 90 mg KOH/g, preferably from 25 to about 95 mg KOH/g, preferably from 25 to about 100 mg KOH/g, preferably from 25 to about 105 mg KOH/g, preferably from 25 to about 110 mg KOH/g, preferably 25 to about 115 mg KOH/g, preferably 25 to about 120 mg KOH/g, preferably 25 to about 125 mg KOH/g, preferably 25 to about 130 mg KOH/g, preferably 25 to about 135 mg KOH/g, preferably 25 to about 140 mg KOH/g, preferably 25 to about 145 mg KOH/g, preferably 25 to about 150 mg KOH/g, preferably 25 to about 155 mg KOH/g, preferably 25 to about 160 mg KOH/g, preferably 25 to about 165 mg KOH/g, preferably 25 to about 170 mg KOH/g, preferably 25 to about 175 mg KOH/g, preferably 25 to about 180 mg KOH/g, preferably 25 to about 185 mg KOH/g, preferably 25 to about 190 mg KOH/g, preferably 25 to about 195 mg KOH/g, preferably 25 to about 200 mg KOH/g, preferably from 25 to about 205 mg KOH/g, preferably from 25 to about 210 mg KOH/g, preferably 25 to about 215 mg KOH/g, preferably 25 to about 220 mg KOH/g, preferably 25 to about 225 mg KOH/g, preferably 25 to about 230 mg KOH/g, preferably 25 to about 235 mg KOH/g, preferably 25 to about 240 mg KOH/g, preferably 25 to about 245 mg KOH/g, preferably 25 to about 250 mg KOH/g, preferably 25 to about 255 mg KOH/g, preferably 25 to about 260 mg KOH/g, preferably 25 to about 265 mg KOH/g, preferably 25 to about 270 mg KOH/g, preferably 25 to about 275 mg KOH/g, preferably 25 to about 280 mg KOH/g, preferably 25 to about 285 mg KOH/g, preferably 25 to about 290 mg KOH/g, preferably 25 to about 295 mg KOH/g, preferably 25 to about 300 mg KOH/g, preferably from 25 to about 305 mg KOH/g, preferably from 25 to about 310 mg KOH/g, preferably 25 to about 315 mg KOH/g, preferably 25 to about 320 mg KOH/g, preferably 25 to about 325 mg KOH/g, preferably 25 to about 330 mg KOH/g, preferably 25 to about 335 mg KOH/g, preferably 25 to about 340 mg KOH/g, preferably 25 to about 345 mg KOH/g, preferably 25 to about 350 mg KOH/g, preferably 25 to about 355 mg KOH/g, preferably 25 to about 360 mg KOH/g, preferably 25 to about 365 mg KOH/g, preferably 25 to about 370 mg KOH/g, preferably 25 to about 375 mg KOH/g, preferably 25 to about 380 mg KOH/g, preferably 4 to about 385 mg KOH/g, preferably 25 to about 390 mg KOH/g, preferably 25 to about 395 mg KOH/g, preferably 25 to about 400 mg KOH/g, preferably from 25 to about 405 mg KOH/g, preferably from 25 to about 410 mg KOH/g, preferably 25 to about 415 mg KOH/g, preferably 25 to about 420 mg KOH/g, preferably 25 to about 425 mg KOH/g, preferably 25 to about 430 mg KOH/g, preferably 25 to about 435 mg KOH/g, preferably 25 to about 440 mg KOH/g, preferably 25 to about 445 mg KOH/g, preferably 25 to about 450 mg KOH/g, preferably 25 to about 455 mg KOH/g, preferably 25 to about 460 mg KOH/g, preferably 25 to about 465 mg KOH/g, preferably 25 to about 470 mg KOH/g, preferably 25 to about 475 mg KOH/g, preferably 25 to about 480 mg KOH/g, preferably 25 to about 485 mg KOH/g, preferably 25 to about 490 mg KOH/g, and preferably 25 to about 495 mg KOH/g In a preferred embodiment, the polyol is mono $(C_1-C_4)$ alkyl ethers of ethylene glycol. In a preferred embodiment, the polar protic solvent is ethylene glycol monomethyl ether.

In some embodiments, the $CaSiO_3$, $g-C_3N_4$, and $V_2O_5$ are dispersed in a polar protic solvent and heating the dispersion at a temperature of from about 100° C. to 250° C., preferably 110° C. to 240° C., preferably 120° C. to 230° C., preferably 130° C. to 220° C., preferably 140° C. to 210° C., preferably 150° C. to 200° C., and preferably 160° C. to 190° C., at a pressure of from about 2.0 to 8.0 bar, preferably 2.5 to 7.5 bar, preferably 3.0 to 7.0 bar, preferably 3.5 to 6.5 bar, preferably 4.0 to 6.0 bar, and preferably 4.5 to 5.5 bar. In a preferred embodiment, the $CaSiO_3$, $g-C_3N_4$, and $V_2O_5$ are dispersed in ethylene glycol monoethyl ether, and the dispersion is heated at a temperature of about 180° C. at a pressure of about 5 bar.

In some embodiments, the method further includes separating the solid nanocomposite from the heated dispersion. In some embodiments, the solid nanocomposite from the heated dispersion is separated by distinct methods, which may include, but are not limited to, gravity filtration, centrifugation, hot filtration, cold filtration, granular media filtration, mechanical filtration, multilayer filtration, and vacuum filtration. In a preferred embodiment, the solid nanocomposite from the heated dispersion is separated by vacuum filtration using the Buchner system. The water may be tap water, distilled water, bidistilled water, deionized water, deionized distilled water, reverse osmosis water, and/or some other water. In a preferred embodiment, the water is distilled water for rinsing in the Buchner system.

The following examples are provided solely for illustration and are not to be construed as limitations of the present disclosure, as many variations thereof are possible without departing from the spirit and scope of the present disclosure.

EXAMPLES

The following examples demonstrate photocatalytic removal of pollutant using a graphite-phase carbon nitride, calcium metavanadate and calcium silicate ($CaV_2O_6$@$CaSiO_3$@$g-C_3N_4$) nanocomposite. The examples are provided solely for illustration and are not to be construed as limitations of the present disclosure, as many variations thereof are possible without departing from the spirit and scope of the present disclosure.

Example 1: Fabricating the Calcium Silicate ($CaSiO_3$)

Equal moles of calcium nitrate ($Ca(NO_3)_2$) and sodium metasilicate ($Na_2SiO_3$) were dispersed in 100 milliliters (mL) of ethanol:water (1:1) in a 150 mL glass beaker and sonicated for 15 minutes (min). The mixture was transferred to a 200 mL autoclave and then placed in an oven operated at 180 degrees Celsius (° C.) for 2.0 hours (h). The product was dispersed in 500 mL distilled water with an ultrasonic bath for 10 min, filtered via a Buchner system, rinsed with distilled water, and dried at 120° C. for 1.0 h.

Example 2: Fabricating the Graphitic-Phase Carbon Nitride ($g-C_3N_4$)

About 30.0 grams (g) of urea was placed in a 250 mL porcelain crucible, covered with its porcelain cover, then the hall crucible and cover were raped with three layers of aluminum foil to reduce the urea loss of evaporation. The crucible was heated via a furnace set at 600° C. for 45 min.

Example 3: Fabricating the Vanadium Oxide ($V_2O_5$)

About 10.0 ammonium metavanadate ($NH_4VO_3$) and 10.0 g of xylose were placed in a 500 ml beaker. 100 mL of distilled water was added to the mixture and heated till a clear solution was obtained. 10 mL of concentrated nitric acid was added to the mixture, which was then heated till the carbonization of xylose. The mixture was placed in an oven set at 120° C. for 5.0 h; the black product was milled in a mortar, placed in a 150 mL porcelain dish, and calcined at 550° C. for 3.0 h.

Example 4: Fabricating the $CaV_2O_6$@$CaSiO_3$@$g-C_3N_4$

An equal mass of $CaSiO_3$, $g-C_3N_4$, and $V_2O_5$ was transferred to a mono wave-200 vial (G30), dispersed in 20 mL ethylene glycol monomethyl ether via an ultrasonic bath for 30 min. The vial was closed with its Teflon cover and placed in the Anton-Baer Monowave-200 operated at 180° C. and 5.0 bar pressure for 1 h. The product was dispersed in 1 liter (L) of distilled water with an ultrasonic bath for 30 minutes, filtered via a Buchner system, rinsed with distilled water, and dried at 150° C. for 2.0 h.

Example 5: Characteristics

XRD was used to identify the crystalline states in each specimen studied, employing the JDX-8030 X-ray, JEOL, made in Japan. Cu-filtered CuKα radiation (1.5418 Angström (Å)) powered at 45 kilo Volt (kV) and 10 milli Ampere (mA) was used to run the patterns. The specimens were tested at ambient temperatures in a range of 2θ=5° to 80°. The surface morphologies of the obtained samples were analyzed by TEM-SAED-HRTEM images obtained using a Tecnai-G20 (USA) transmission electron microscope with a 200 kV speed voltage. $N_2$ adsorption isotherm obtained at 77 K using Micrometrics ASAP 2020 Brünauer-Emmett-Teller analyzer was used to calculate the surface characteristics, specifically the BET surface area, total pore volume (Vp), and mean pore radius (r). Before beginning the measurement, the samples were outgassed for three hours at 200° C. with a decreased pressure of $10^{-5}$ Torr. The Shimadzu UV-Vis spectrophotometer (2600i UV-Vis, Japan) was used to record UV-Vis diffuse reflectance spectra (DRS) in the 200-800 nm region, using the typical barium sulfate ($BaSO_4$).

Figure 2:
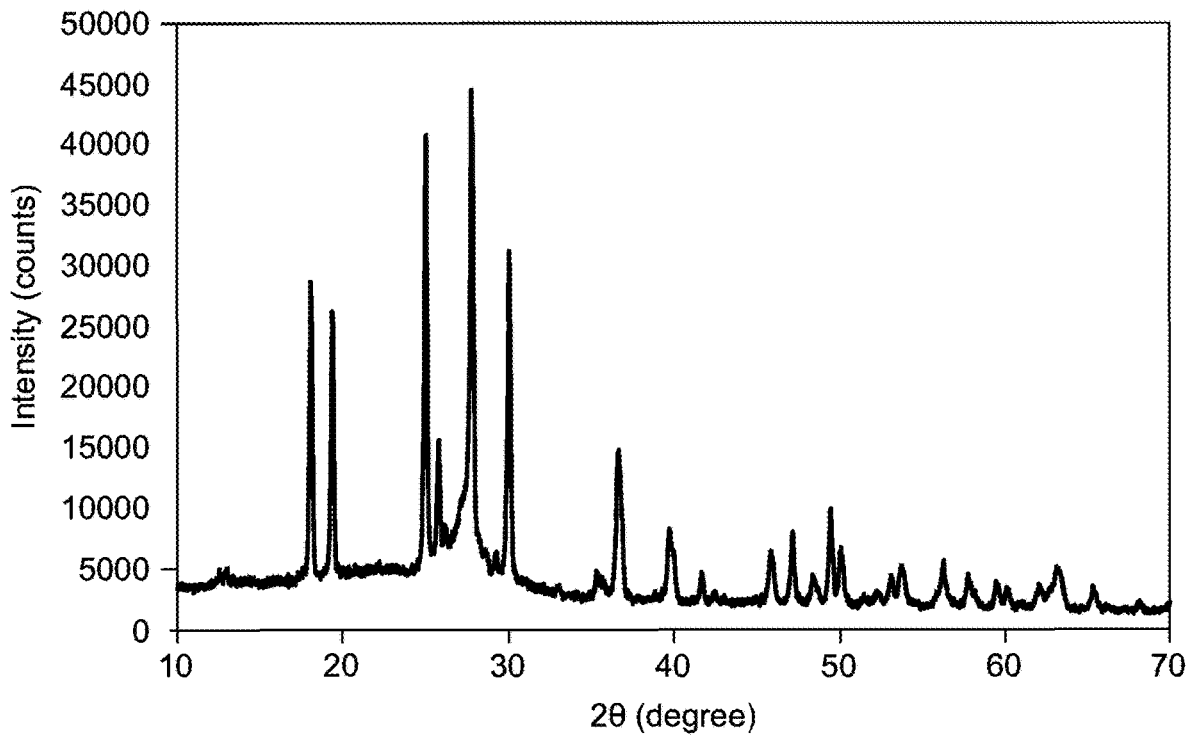
FIG. 2 depicts X-ray diffraction (XRD) pattern of the $CaV_2O_6/CaSiO_3/g-C_3N_4$ nanocomposite, according to certain embodiments.

The crystallinity and phases identification present in $CaV_2O_6$/$CaSiO_3$/$g-C_3N_4$ catalyst was analyzed by XRD and the results are given in FIG. 2. The intense peaks and high intensity values indicate that the powder is highly crystalline in nature. Examination of the diffraction patterns with the standard PDF cards reveals the presence of $CaV_2O_6$ as major phase together with $CaSiO_3$, and $g-C_3N_4$ as minor phases. The $CaV_2O_6$ phase was indexed to the 2θ values of 25.1°, 25.9°, 27.8°, 27.9°, 30.1°, 36.8°, 36.9°, 39.7°, and 49.6°. These diffractions are, respectively, assigned to (201), (100), (−202), (−111), (111), (−311), (400), (003) and (020) plans of the monoclinic phase of $CaV_2O_6$ (Reference code No. 01-073-0186). The $CaSiO_3$ phase (COD No. 01-072-2284) was detected at 2θ values of 25.2°, 30.2°, and 41.8°. These diffractions came from (002), (120), and (−231), respectively. The diffractions related to $g-C_3N_4$ were observed at 45.8°, 53.7°, 71.8° and 79.4° (COD No. 1534042). Minor traces of $SiO_2$ were detected at 2θ value of 19.3° and 25.1° (Reference code No. 00-049-0629). No other phases were detected indicating the successful fabrication of $CaV_2O_6$/$CaSiO_3$/$g-C_3N_4$.

Figure 3A:
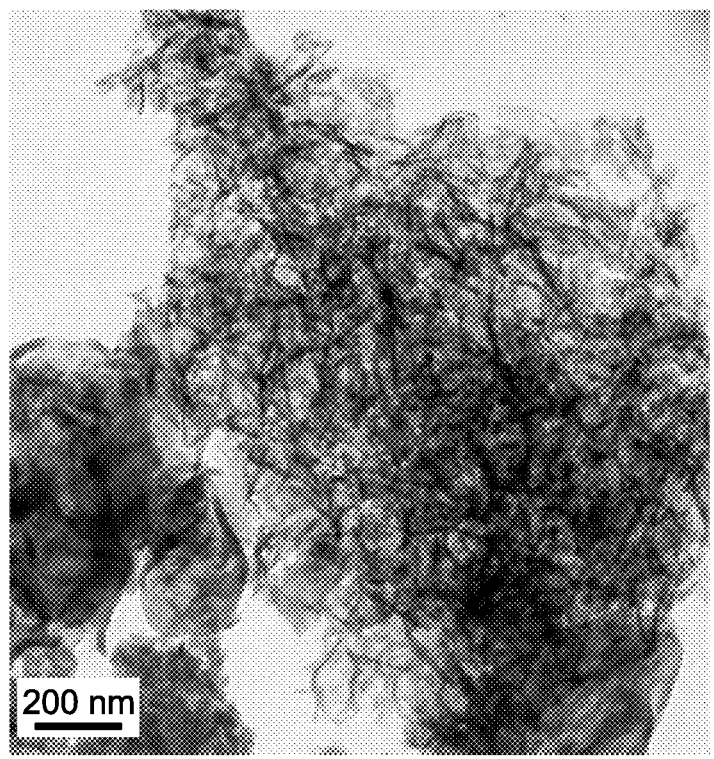
FIG. 3A shows a transmission electron microscopy (TEM) image of the $CaV_2O_6/CaSiO_3/g-C_3N_4$ nanocomposite at a 200-nanometer (nm) scale, according to certain embodiments.
Figure 3B:
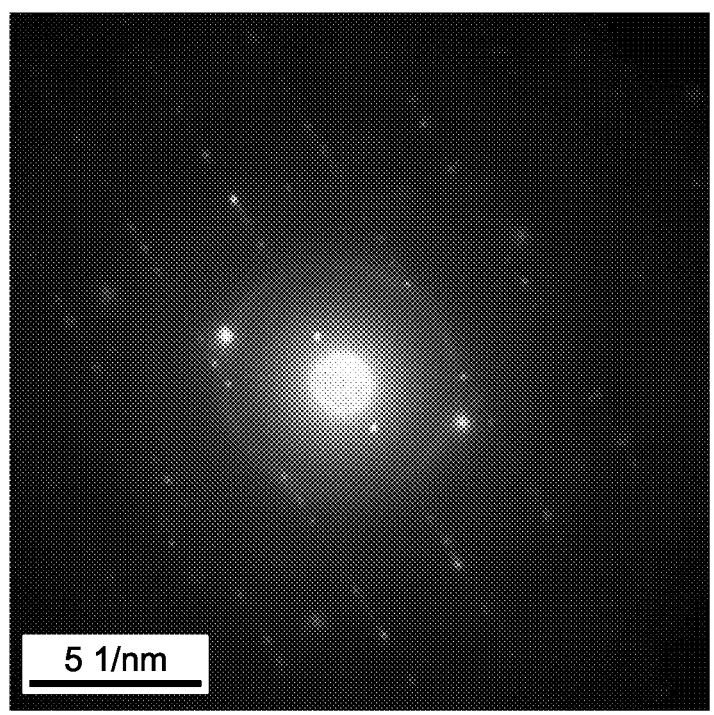
FIG. 3B shows a selected area electron diffraction (SAED) pattern of the $CaV_2O_6/CaSiO_3/g-C_3N_4$ nanocomposite, according to certain embodiments.

TEM images of $CaV_2O_6$/$CaSiO_3$/$g-C_3N_4$ nanocomposite were presented in FIG. 3A. The TEM images showed a two-dimensional porous structure constructed with curled and wrinkled nanosheets and platelets of the $g-C_3N_4$, as shown in FIG. 3A. The image also shows well dispersion of homogeneous nanowires of metal oxides with an average length of 90.6 nanometers (nm) on nanosheets of $g-C_3N_4$. The corresponding selected area electron diffraction (SAED) pattern, shown in FIG. 3B, reveals diffraction spots with interplanar spacing of 0.23 nm, 0.219 nm, 0.17 nm, and 0.146 nm due to (003, $CaV_2O_6$, (−231, $CaSiO_3$) and (003, $CaV_2O_6$), diffraction planes, respectively as confirmed from XRD data.

Figure 4A:
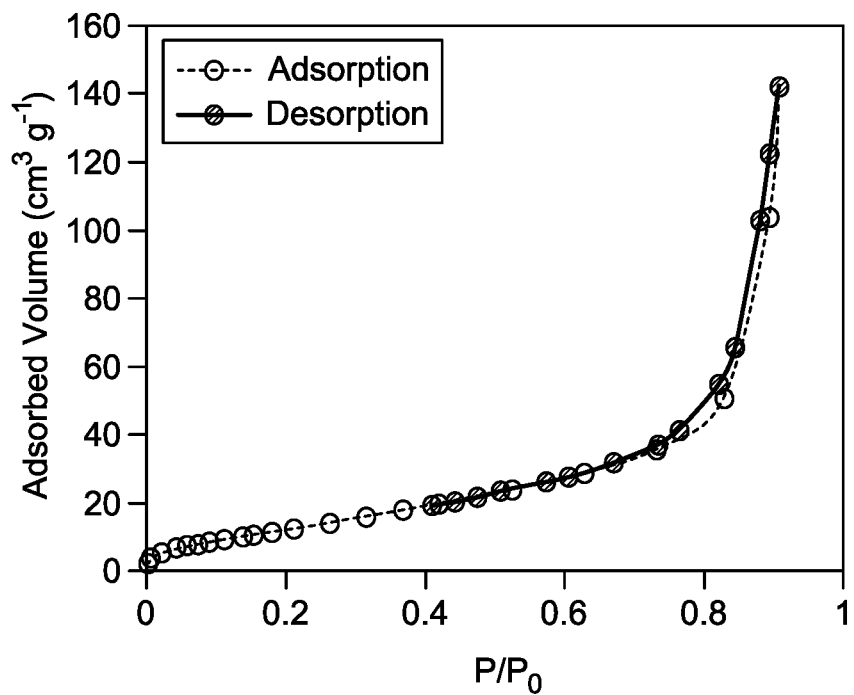
FIG. 4A depicts $N_2$ adsorption-desorption isotherms of the $CaV_2O_6/CaSiO_3/g-C_3N_4$ nanocomposite, according to certain embodiments.
Figure 4B:
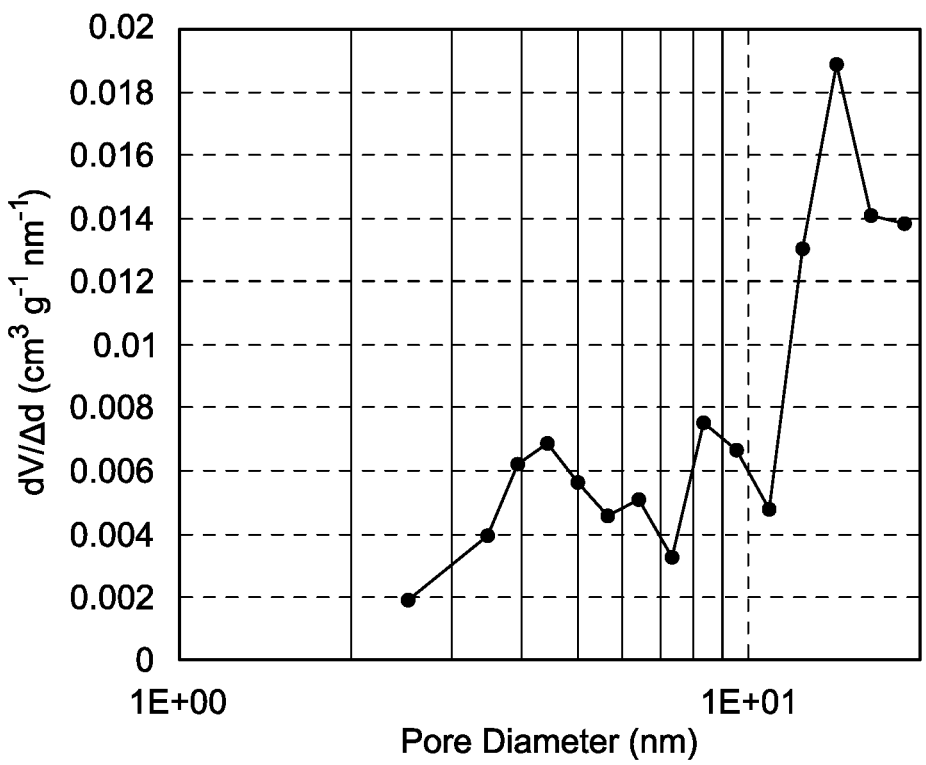
FIG. 4B depicts the pore size distribution of the $CaV_2O_6/CaSiO_3/g-C_3N_4$ nanocomposite, according to certain embodiments.

FIG. 4 displays the nitrogen adsorption-desorption isotherms of $CaV_2O_6$/$CaSiO_3$/$g-C_3N_4$ nanocomposite. The nitrogen sorption isotherm of the composite belongs to type IV with narrow hysteresis loop, indicating the formation of mesoporous structures. However, shifting the loop to a relatively higher pressure ($P/P_0$=0.73-1) indicates the presence of wide mesopores, which may result from the deposition of metal oxides particles in the wide pores of $g-C_3N_4$, as shown in FIG. 4A. Furthermore, the BET surface area of the $CaV_2O_6$/$CaSiO_3$/$g-C_3N_4$ sample was calculated to be 57.02 $m^2g^{-1}$. The marked high specific surface area reflects the good dispersion of these metal oxides nanoparticles on $g-C_3N_4$. and $CaSiO_3$. Moreover, the pore size distribution curves, plotted using the BJH method, for the $CaV_2O_6$/$CaSiO_3$/$g-C_3N_4$ sample exhibited trimodal distribution with average pore diameters maximized at 4.3 nm, 8.5 nm, and 14.27 nm and pore volume of 0.22 $cm^3g^{-1}$, as shown in FIG. 4B. All the isotherms belong to the category H3 type of pores, which do not exhibit limiting adsorption at high $P/P_0$, and arise due to aggregation of plate-like particles giving rise to slit-shaped pores. This indicates that the assembly of $CaV_2O_6$/$CaSiO_3$/$g-C_3N_4$ nanocomposite provoked a mesoporous array.

Figure 5A:
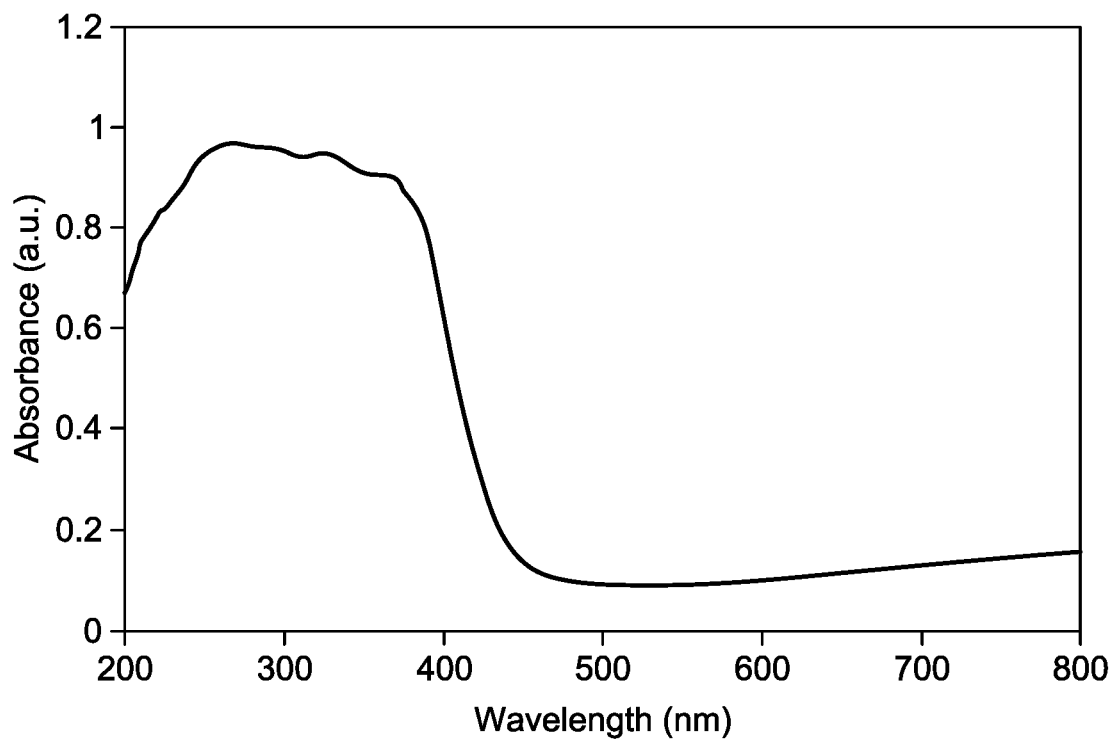
FIG. 5A depicts UV-Vis DRS of the $CaV_2O_6/CaSiO_3/g-C_3N_4$ nanocomposite, according to certain embodiments.

The utilization of the wide-range visible-light-region in photocatalytic processes require a low bandgap (1.77 to 2.92 eV). as a candidate for visible light absorption and utilization for the photocatalytic purposes [Li, Y.; Wang, J.; Yao, H.; Dang, L.; Li, Z. *Efficient decomposition of organic compounds and reaction mechanism with BiOI photocatalyst under visible light irradiation. J. Mol. Catal. A: Chem.* 2011, 334(1-2), 116-122, incorporated herein by reference in its entirety]. One of the main goals of using visible light induced photocatalyst is to displace the harmful ultraviolet light with safe visible light or sunlight. The absorbance of the prepared $CaV_2O_6/CaSiO_3/g-C_3N_4$ was measured in the range of 200 nm to 800 nm, as shown in FIG. 5A.

Figure 5B:
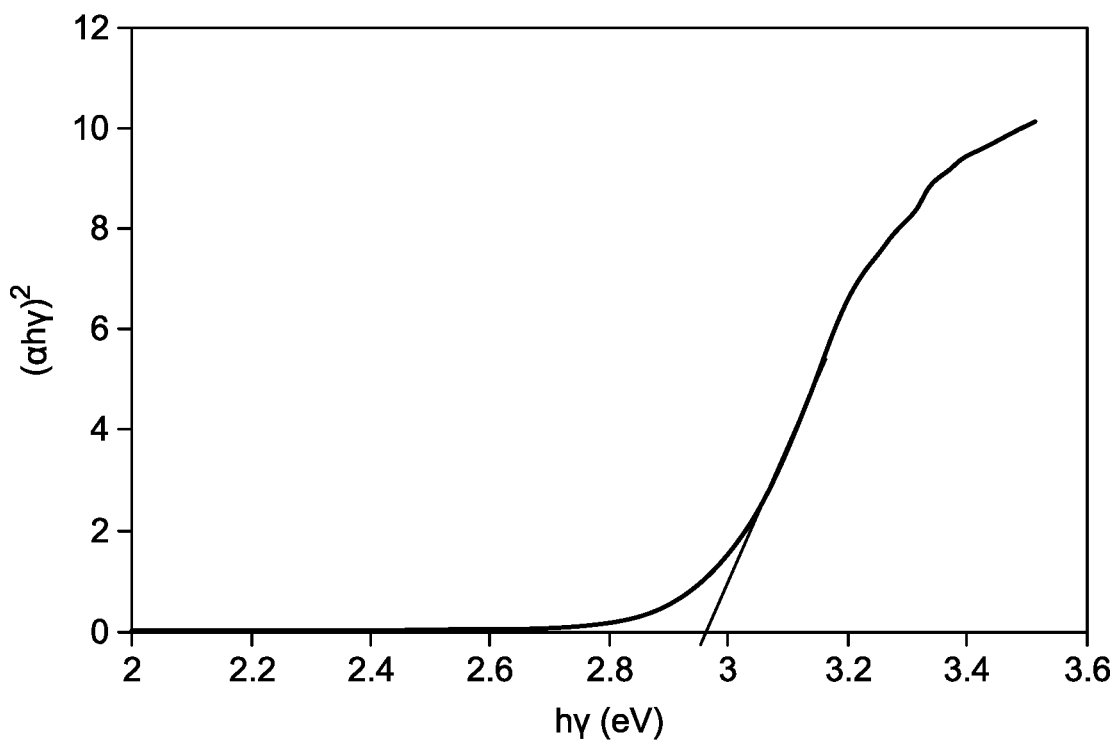
FIG. 5B depicts corresponding band gap energy of the $CaV_2O_6/CaSiO_3/g-C_3N_4$ nanocomposite, according to certain embodiments.

It's interesting to note that when the $CaV_2O_6/CaSiO_3$ was incorporated with $g-C_3N_4$, the composites' absorption in the visible area progressively increased. The difference between the band gap energies of $CaV_2O_6/CaSiO_3$ and bare $g-C_3N_4$ may be the cause of this occurrence. The Tauc plot (Equation 1) was employed in determining the bandgap-energy ($E_g$) for the synthesized photocatalyst.

$$ahy = A(h\gamma - E_g)^n \quad (1)$$

where: h represents the Plank's constant, a and y are the absorption coefficient and photonic frequency [Cheng, H.; Huang, B.; Dai, Y.; Qin, X.; Zhang, X. *One-step synthesis of the nanostructured AgI/BiOI composites with highly enhanced visible-light photocatalytic performances. Langmuir* 2010, 26(9), 6618-6624, incorporated herein by reference in its entirety]. By calculating the power of n, a value of n=1/2 was revealed to propose a direct permissible transition. As observed in FIG. 5B, the $E_g$ was estimated at 2.92 eV, corresponding to the $CaV_2O_6/CaSiO_3/g-C_3N_4$ composite. The reduced band gap of the $CaV_2O_6/CaSiO_3/g-C_3N_4$ composite and more response to the visible light were caused by the inserting of metal oxides nanoparticles on $g-C_3N_4$, thus more efficient utilization of solar energy could be achieved, and the improved photocatalytic activity of the $CaV_2O_6/CaSiO_3/g-C_3N_4$ composite could be anticipated. The estimated band gap typical that of BiOI known for its high activities in degrading organic compounds under visible light [Mehrali-Afjani, M.; Nezamzadeh-Ejhieh, A. and Aghaei, H. *A brief study on the kinetic aspect of the photodegradation and mineralization of BiOI-Ag₃PO₄ towards sodium diclofenac. Chem. Phys. Lett.* 2020, 759, 137873; Jeevanantham, N.; Balasundaram, O. N. *High-performance visible light photocatalytic activity of cobalt (Co) doped CdS nanoparticles by wet chemical route. J. Iranian Soc.* 2019, 16(2), 243-251; and Sabonian, M.; Mahanpoor, K. *Preparation of ZnO nanocatalyst supported on todorokite and photocatalytic efficiency in the reduction of chromium (VI) pollutant from aqueous solution. Iranian J. Catal.* 2019, 9(3), 201-211; Zeng, L.; Zhe, F.; Wang, Y.; Zhang, Q.; Zhao, X.; Hu, X.; Wu, Y.; He, Y. *Preparation of interstitial carbon doped BiOI for enhanced performance in photocatalytic nitrogen fixation and methyl orange degradation. J. Colloid Interface Sci.* 2019, 539, 563-574, incorporated herein by reference in its entirety].

Numerous modifications and variations of the present disclosure are possible in light of the above teachings. It is therefore to be understood that within the scope of the appended claims, the invention may be practiced otherwise than as specifically described herein.

The invention claimed is:

1. A method of photocatalytic degradation of a pollutant, comprising:
    contacting a solution comprising one or more pollutants with a graphite-phase carbon nitride, calcium metavanadate, and calcium silicate ($CaV_2O_6/CaSiO_3/g-C_3N_4$) nanocomposite, and
    irradiating the nanocomposite with light to degrade the one or more pollutants in the solution.

2. The method of claim 1, wherein the $CaV_2O_6/CaSiO_3/g-C_3N_4$ nanocomposite comprises 20 to 40 wt % of graphite-phase carbon nitride ($g-C_3N_4$), 20 to 40 wt % of calcium metavanadate ($CaV_2O_6$), and 20 to 40 w % of calcium silicate ($CaSiO_3$).

3. The method of claim 1, wherein the $CaV_2O_6/CaSiO_3/g-C_3N_4$ nanocomposite is porous, and
    wherein the $g-C_3N_4$ is in the form of nanosheets;
    the $CaV_2O_6$ and the $CaSiO_3$ are a homogeneous mixture in the form of nanowires; and
    the nanowires are distributed between the nanosheets.

4. The method of claim 1, wherein the $CaV_2O_6/CaSiO_3/g-C_3N_4$ nanocomposite has an interplanar spacing of 0.12 to 0.25 nm between the $g-C_3N_4$ sheets.

5. The method of claim 1, wherein the $CaV_2O_6/CaSiO_3/g-C_3N_4$ nanocomposite is porous and has an average pore diameter of 2 to 20 nm.

6. The method of claim 1, wherein the $CaV_2O_6/CaSiO_3/g-C_3N_4$ nanocomposite has a Brunauer-Emmett-Teller (BET) surface area of 55 to 60 $cm^2g^{-1}$.

7. The method of claim 1, wherein the $CaV_2O_6/CaSiO_3/g-C_3N_4$ nanocomposite has a pore volume of 0.1 to 0.3 $cm^3g^{-1}$.

8. The method of claim 1, wherein the $CaV_2O_6/CaSiO_3/g-C_3N_4$ nanocomposite has a bandgap energy of 2.9 to 3 eV.

9. The method of claim 1, wherein the $CaV_2O_6/CaSiO_3/g-C_3N_4$ nanocomposite has a bandgap energy of 2.92 eV.

10. The method of claim 1, wherein the $CaV_2O_6/CaSiO_3/g-C_3N_4$ nanocomposite has an absorption at a wavelength of 200 to 500 nm.

11. The method of claim 1, wherein the $CaV_2O_6/CaSiO_3/g-C_3N_4$ nanocomposite is crystalline.

12. The method of claim 1, wherein the $CaV_2O_6/CaSiO_3/g-C_3N_4$ nanocomposite comprises:
    a major phase comprises a $CaV_2O_6$ phase and a $CaSiO_3$ phase; and
    a minor phase comprises a $g-C_3N_4$ phase.

13. The method of claim 1, wherein the $CaV_2O_6/CaSiO_3/g-C_3N_4$ nanocomposite has a $CaV_2O_6$ phase with 2θ values of 25° to 50°.

14. The method of claim 1, wherein the $CaV_2O_6/CaSiO_3/g-C_3N_4$ nanocomposite has a $CaSiO_3$ phase with 2θ values of 25° to 45°.

15. The method of claim 1, wherein the $CaV_2O_6/CaSiO_3/g-C_3N_4$ nanocomposite has a $g-C_3N_4$ phase with 2θ values of 45° to 80°.

16. The method of claim 1, wherein the irradiating occurs at a wavelength of 50 to 1000 nm.

17. The method of claim 1, wherein the $CaV_2O_6/CaSiO_3/g-C_3N_4$ nanocomposite has an absorption at a wavelength of 600 to 800 nm.

18. The method of claim 1, wherein the $CaV_2O_6/CaSiO_3/g-C_3N_4$ nanocomposite is produced in a process, comprising:
    mixing calcium nitrate and sodium metasilicate in a solvent to form silicate product;
    heating urea at 500 to 700° C. for 30 to 60 minutes to form $g-C_3N_4$ product;

carbonizing ammonium metavanadate with xylose in an aqueous acid solution to form vanadate product;

microwaving the silicate product, the g-$C_3N_4$ product, and the vanadate product in an organic solvent to form the $CaV_2O_6$/$CaSiO_3$/g-$C_3N_4$ nanocomposite.

19. The method of claim 1, wherein the $CaV_2O_6$/$CaSiO_3$/g-$C_3N_4$ nanocomposite is porous and has slit-shaped pores.

20. The method of claim 1, wherein the irradiating occurs at a wavelength of 200 to 800 nm.

\* \* \* \* \*